US008571602B2

(12) United States Patent
Horton et al.

(10) Patent No.: US 8,571,602 B2
(45) Date of Patent: Oct. 29, 2013

(54) UNIVERSAL MOBILE PRINT AGENT

(75) Inventors: Stephen W. Horton, San Diego, CA (US); Timothy James Yates, San Marcos, CA (US); Charles Seunghwan Han, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 928 days.

(21) Appl. No.: 11/760,150

(22) Filed: Jun. 8, 2007

(65) Prior Publication Data

US 2008/0004075 A1  Jan. 3, 2008

Related U.S. Application Data

(60) Provisional application No. 60/812,247, filed on Jun. 9, 2006, provisional application No. 60/838,549, filed on Aug. 17, 2006.

(51) Int. Cl.
*H04B 1/38* (2006.01)

(52) U.S. Cl.
USPC .......... 455/557; 370/408; 358/1.15; 709/218; 455/434; 455/456.6

(58) Field of Classification Search
USPC ............. 455/450, 509, 16, 62, 445, 551, 557, 455/434, 456.1, 456.6; 323/282; 375/211, 375/267, 347; 385/132; 264/328; 370/455, 370/315, 408; 358/1.15; 709/218
See application file for complete search history.

(56) References Cited

U.S. PATENT DOCUMENTS

| 6,148,261 | A  | * | 11/2000 | Obradovich et al. | .......... 701/208 |
| 6,332,146 | B1 | * | 12/2001 | Jebens et al. | ........................... 1/1 |
| 7,061,633 | B1 | * | 6/2006  | Shima | ........................... 358/1.15 |
| 7,237,717 | B1 | * | 7/2007  | Rao et al. | ........................ 235/386 |

(Continued)

FOREIGN PATENT DOCUMENTS

| CN | 1655109      | 8/2005 |
| JP | 2003196076 A | 7/2003 |

(Continued)

OTHER PUBLICATIONS

Nokia: "Nokia N70" User's Manual, Aug. 18, 2005, XP002466582 Retrieved from the Internet: URL:http://nds1.nokia.com/phones/files/guides/Nokia_N70_1_UG_en.pdf> (retrieved on Jan. 28, 2008) pp. 33, 44, 82, 85, 86.

(Continued)

*Primary Examiner* — Mahendra Patel
(74) *Attorney, Agent, or Firm* — Fariba Yadegar-Bandari

(57) ABSTRACT

Methods and apparatus for enabling output from a mobile device are described herein. A mobile device having an image capture device can selectively generate a hard copy output of a captured image by interfacing with an output device. The mobile device can selectively interface with the output device directly or indirectly via one or more intermediate devices and/or systems. The mobile device can interface directly with an output device using a wired or wireless connection, and can selectively operate as a host or client. The mobile device can selectively couple the stored image to a remote output device via a wireless connection. The mobile device can select the remote output device from a predetermined list of devices, or can be supplied a dynamic list of remote output devices. The dynamic list of output devices can be updated, for example, based on a location of the mobile device.

30 Claims, 7 Drawing Sheets

(56) References Cited

U.S. PATENT DOCUMENTS

| | | | |
|---|---|---|---|
| 2002/0181010 A1* | 12/2002 | Pineau | 358/1.15 |
| 2003/0038963 A1* | 2/2003 | Yamaguchi | 358/1.15 |
| 2003/0050963 A1 | 3/2003 | Lamming et al. | |
| 2003/0189644 A1 | 10/2003 | Kikugawa | |
| 2003/0202104 A1* | 10/2003 | Werner | 348/207.99 |
| 2003/0223766 A1 | 12/2003 | Imai | |
| 2004/0004737 A1* | 1/2004 | Kahn et al. | 358/1.15 |
| 2004/0033795 A1* | 2/2004 | Walsh et al. | 455/404.1 |
| 2004/0078236 A1* | 4/2004 | Stoodley et al. | 705/2 |
| 2004/0125401 A1 | 7/2004 | Earl et al. | |
| 2004/0172586 A1* | 9/2004 | Ragnet et al. | 715/500 |
| 2004/0203358 A1 | 10/2004 | Anderson et al. | |
| 2005/0221844 A1* | 10/2005 | Trethewey et al. | 455/456.6 |
| 2005/0225643 A1* | 10/2005 | Grignani | 348/207.99 |
| 2006/0013630 A1* | 1/2006 | Silverbrook et al. | 400/62 |
| 2006/0046709 A1 | 3/2006 | Krumm et al. | |
| 2006/0098899 A1* | 5/2006 | King et al. | 382/305 |
| 2006/0211421 A1* | 9/2006 | Vuong et al. | 455/434 |
| 2007/0032244 A1* | 2/2007 | Counts et al. | 455/456.1 |
| 2007/0077889 A1* | 4/2007 | Blight et al. | 455/41.2 |
| 2007/0124436 A1* | 5/2007 | Shepherd | 709/223 |
| 2007/0127069 A1* | 6/2007 | Steele et al. | 358/1.16 |
| 2008/0248828 A1* | 10/2008 | Tomiyasu | 455/550.1 |
| 2009/0300239 A1* | 12/2009 | Hubo et al. | 710/63 |

FOREIGN PATENT DOCUMENTS

| | | |
|---|---|---|
| JP | 2003280778 | 10/2003 |
| JP | 2004007467 A | 1/2004 |
| JP | 2004118261 A | 4/2004 |
| JP | 2004252979 | 9/2004 |
| JP | 2004274152 A | 9/2004 |
| JP | 2004280835 | 10/2004 |
| JP | 2005007659 | 1/2005 |
| JP | 2006010687 A | 1/2006 |
| JP | 2006099193 | 4/2006 |

OTHER PUBLICATIONS

International Search Report—PCT/US07/070841, International Search Authority—European Patent Office—Feb. 11, 2008.

Miller: "The Nokia E61 experience" [Online] Jun. 7, 2006, Retrieved from the Internet: URL:http://blogs_zdnetcom/mobile-gadgeteeri?p=18> [retrieved on Apr. 20, 2009].

Written Opinion—PCT/US2007/070841, International Search Authority, European Patent Office, Nov. 2, 2008.

* cited by examiner

UNIVERSAL MOBILE PRINT AGENT

CROSS-REFERENCES TO RELATED APPLICATIONS

This application claims the benefit of U.S. Provisional Application No. 60/812,247, filed Jun. 9, 2006, entitled UNIVERSAL MOBILE PICTURE PRINTING METHOD, SYSTEM AND APPARATUS; and U.S. Provisional Application No. 60/838,549, filed Aug. 17, 2006, entitled UNIVERSAL MOBILE PICTURE PRINTING METHOD, SYSTEM AND APPARATUS, both of which are hereby incorporated herein by reference in their entirety.

BACKGROUND OF THE INVENTION

Some mobile devices, such as cellular phones, may include an image capture device, such as a camera. A user of the mobile device can conveniently capture and store images using the image capture device. Typically, a stored image can be viewed using a display on the mobile device. The mobile device typically allows selected images to be retrieved from memory and transmitted to a remote location, such as another mobile device or a networked computer.

However, the typical mobile device provides only limited opportunities and processes for generating a hard copy of a stored image. Most mobile devices lack any ability to autonomously generate a hard copy output, mainly due to the limited physical size of the mobile device. Therefore, a mobile device needs to interface with an output device, such as a printer, in order to produce a hard copy output of a stored image.

Mobile devices are typically required to interface with the output device through some intermediate device, such as a computer, in order to control the output device. The actual interface with the output device is controlled by the computer and not the mobile device. Therefore, in order to produce a hard copy output of a stored image, the mobile device communicates the stored image to the computer, and the user controls the computer to produce the hard copy output from the output device.

The presently available process for producing a hard copy output of a stored image is tedious and not convenient for the user of the mobile device. Additionally, the output process is inflexible and requires the user to have access to a computer coupled to an output device.

BRIEF SUMMARY OF THE INVENTION

Methods and apparatus for enabling output from a mobile device are described herein. A mobile device having an image capture device can selectively generate a hard copy output of a captured image by interfacing with an output device. The mobile device can selectively interface with the output device directly or indirectly via one or more intermediate devices and/or systems. The mobile device can interface directly with an output device using a wired or wireless connection, and can selectively operate as a host or client. The mobile device can selectively couple the stored image to a remote output device via a wireless connection. The mobile device can select the remote output device from a predetermined list of devices, or can be supplied a dynamic list of remote output devices. The dynamic list of output devices can be updated, for example, based on a location of the mobile device.

Aspects of the invention include a method of providing print output for a mobile device. The method includes initializing a print output from the mobile device, determining whether a selected output device is local or remote, determining whether a connection to the output device is established as wired or wireless, and communicating at least one image stored within the mobile device to the selected output device via the connection.

Aspects of the invention include a method of providing print output for a mobile device. The method includes receiving a selection of an output device for printing an image stored within the mobile device, enabling a connection to a selected output device via one of a wireless transceiver within the mobile device or a wired output port on the mobile device based on an identity of the selected output device, and communicating the image to the selected output device by one of the wireless transceiver or the wired output port.

Aspects of the invention include an apparatus configured to provide mobile print output. The apparatus includes an image capture device, a wireless transceiver, a communication processing module coupled to a wired communication port, an Universal Print Agent (UPA) configured to selectively communicate an image captured by the image capture device to an output device using one of the wireless transceiver or the wired communication port based on an identity of the output device.

Aspects of the invention include an apparatus configured to provide mobile print output. The apparatus includes a machine-readable memory storing a set of processor executable instructions, when executed by the processor configured to perform a method that includes receiving a command to initialize a print output from a mobile device, determining whether a selected output device is local or remote, determining whether a connection to the output device is established as wired or wireless, and communicating at least one image stored within the mobile device to the selected output device via the connection.

Aspects of the invention include an apparatus configured to provide mobile print output. The apparatus includes means for receiving a command to initialize a print output from a mobile device, means for determining whether a selected output device is local or remote, means for determining whether a connection to the output device is established as wired or wireless, and means for communicating at least one image stored within the mobile device to the selected output device via the connection.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

Users of mobile devices with built-in cameras may wish to print photographs, and particularly high quality pictures.

A method, system and apparatus may enable mobile picture printing across various chipset platforms. The method and system may tie together a modem, connectivity, and location capabilities in an apparatus to enable a mobile printing service, which can be used at various locations, in various ways, and at various times. The apparatus, such as a mobile device, may enable various mobile printing use cases.

The method, system and apparatus may provide a unified and coordinated interface that manages information and data used to make mobile picture printing relatively convenient and easy to use. The interface may work with printing application software.

A mobile device, such as a cellular telephone, can include an image capture device. The mobile phone can capture and store one or more images. The mobile device can output one or more stored images to a display for transient viewing and can output one or more stored images to an output device, such as a printer, where the image can be converted to a hard copy output.

Although the mobile device is described in terms of a wireless telephone, the mobile device is not limited to a telephone and is not limited to communicating over a wireless telephone system. Additionally, the output is described in terms of printing a picture stored in the mobile device, but output is not limited to pictures, but may be any type of information stored in the mobile device, including text, data, configuration information, images, as well as multimedia files.

The mobile device can be configured to output a stored image to either a local output device or a remote output device. A local output device can be considered an output device which communicates directly with the mobile device, without the need to communicate using an intermediate device. Additionally, the mobile device connects to the output device via a wired link or a wireless link. Thus, the mobile device supports output over each of generally four connection categories. The four connection categories include remote wired connection, remote wireless connection, local wired connection and local wireless connection. Additionally, the mobile device may support multiple output options under each connection category.

The mobile device can include a Universal Print Agent (UPA) that operates to manage information and data required for all possible output scenarios. The mobile device may also integrate a mobile print application on top of the UPA for a seamless, easy to use, and trusted printing experience. Tight coordination of these two pieces may create an end-to-end system that is complete, convenient and easy to use.

Figure 1:
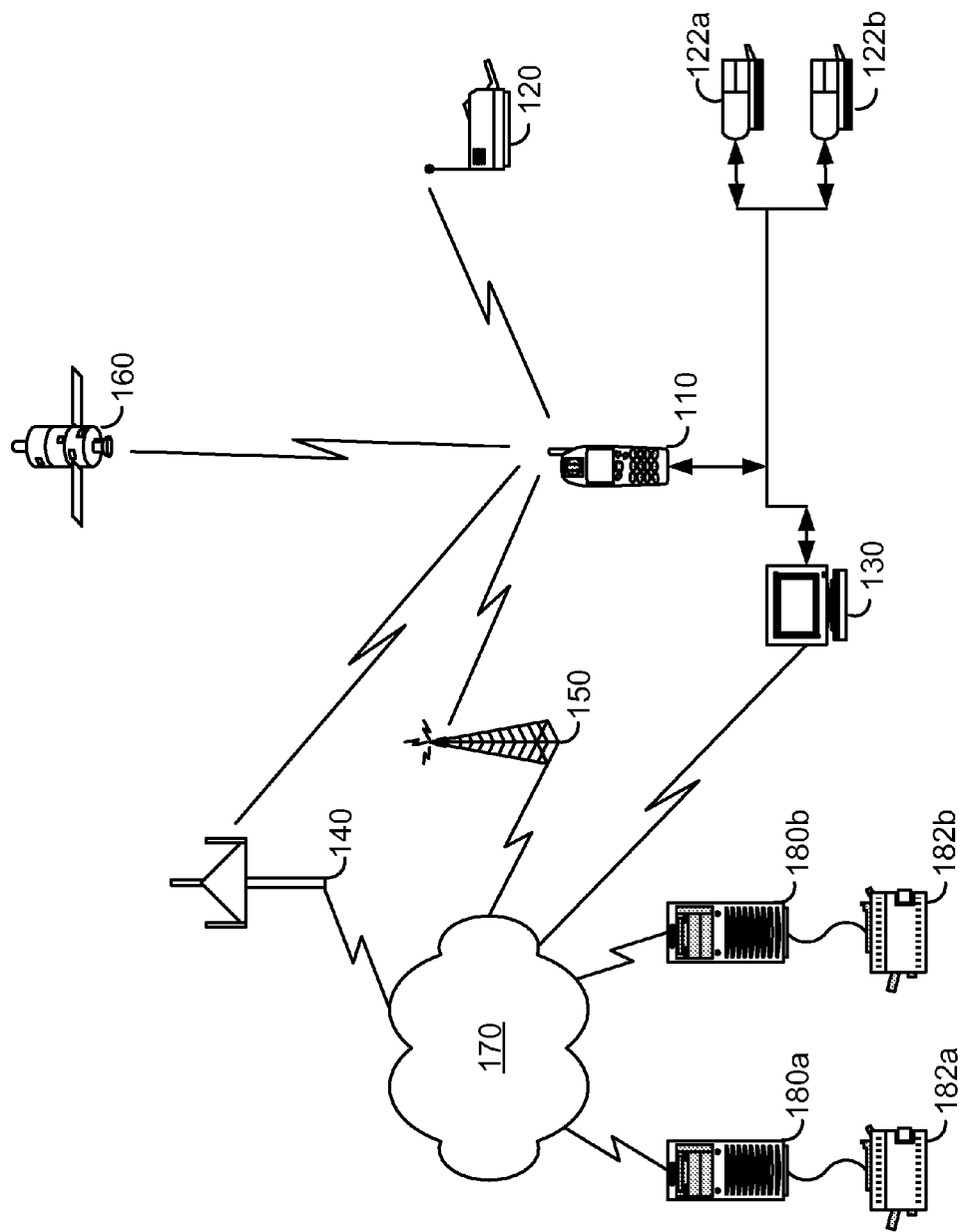
FIG. 1 is a simplified functional block diagram of an embodiment of a mobile device in a dynamic output environment.

FIG. 1 is a simplified functional block diagram of an embodiment of a mobile device 110 in a dynamic output environment 100. The dynamic output environment 100 of FIG. 1 illustrates various communication interfaces and multiple paths to output devices that may be available to a mobile device 110. The dynamic output environment 100 of FIG. 1 illustrates one possible environment, and the environment may change such that one or more paths to output devices may be omitted, and one or more additional output paths similar to the depicted output paths may be present and available to the mobile device 110.

The dynamic output environment 100 of FIG. 1 depicts at least one example from each of the various connection categories. The mobile device 110 can be configured to run a mobile print application interfacing with a Universal Print Agent (UPA) to select one of the output paths over which a selected image is communicated for output.

The mobile device 110 can be configured to select a local output device via a wired or wireless connection. For example, the mobile device 110 can include a wireless transceiver configured to communicate over a Local Area Network (LAN) or Personal Area Network (PAN). The wireless transceiver can be, for example, an IEEE 802.11 enabled transceiver or a Bluetooth enabled transceiver.

The mobile device 110 can utilize the wireless transceiver to communicate directly with a wireless enabled printer 120. The mobile device 110 can be configured to operate either as a host device or a client device, depending on the capabilities of the wireless enabled printer 120. The mobile device 110 can connect with the wireless enabled printer 120 and exchange a selected image for output. As an example, the mobile device 110 can connect the to wireless enabled printer 120 using an IEEE 802.11 ad hoc connection in order to communicate images to the wireless enabled printer 120 for output.

The mobile device 110 can also connect to local printers via a wired connection. The mobile device 110 can include one or more wired ports to interface a wired connection to a printer. For example, the mobile device 110 can include distinct ports that are configured to support Universal Serial Bus (USB) connections as either a host device or a client (peripheral) device.

In one embodiment, the mobile device 110 can include one or more USB Standard-A or mini-A receptacles and the mobile device 110 can operate as a host device to a USB wired printer 122a operating as a client or peripheral device. The wired printer 122a can support, for example, the Universal Plug-and-Play (UPnP) standard. The mobile device 110 can communicate over the wired connection with the wired printer 122a to retrieve any driver information needed to support outputting a desired image or file to the wired printer 122a.

In another embodiment, the mobile device 110 can include one or more USB Standard-B or mini-B receptacles and the mobile device 110 can operate as a client or peripheral device to a wired USB printer 122b operating as a host device. As one example, the wired USB printer 122b can support the PictBridge standard. The wired USB printer 122b operates as a host device to enable selection and printing of one or more images stored on the mobile device 110.

The mobile device 110 can also connect to a local computer 130 over a wired connection. The mobile device 110 can, for example, connect to a local computer 130 via a USB connection, and the mobile device 110 can operate as a host or peripheral. In typical situations, the mobile device 110 is configured to operate as a peripheral device, but is not limited to such a configuration.

A user controlling the local computer 130 operating as a host device can select one or more captured images from the mobile device 110 for retrieval and subsequent communication to an output device. The local computer 130 can be, for example, coupled to a network 170, but may also couple images to a local printer (not shown). The manner and process of interfacing a computer 130 with a printer is well known, and once selected images are transferred to the local computer 130, the local computer 130 may control the manner in which the images are output.

The mobile device 110 can be, for example, a cellular telephone that is configured to support communications via a wireless communication system 140. The communication system 140 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. For VT applications, system 10 may be designed to support high data rate (HDR) technologies such as cdma2000 1x EV-DO, Release 0, Revision A or subsequent EV-DO releases.

The communication system 140 can be configured to connect the mobile device 110 to one or more networks 170. The networks 170 can include a Public Switched Telephone Network (PSTN) as well as a packet switched network, such as the Internet. Although FIG. 1 depicts a single network 170 image, it is understood that the network 170 may include multiple networks, and the multiple networks may be interconnected or distinct. Although the communication system 140 is depicted as an antenna in FIG. 1, the communication system includes Base Station Controllers, Mobile Station Controllers, and network Gateways needed to interface the communication system 140 to the networks 170.

The mobile device 110 can utilize the communication system 140 to connect to a remote printer, e.g. 182b. The mobile device 110 can access a remote printer directly or may access a remote printer indirectly. For example, the mobile device 110 may have available or may have access to a listing or catalog of available printers coupled to the communication system 140. A user can navigate to a desired remote printer and send a desired image to the remote printer via the communication system. In one example, the mobile device 110 can access a network 170 via the communication system 140 and can navigate to a desired remote computer 180a. The mobile device 110 can communicate one or more images, via the communication system 140, to the computer 180b for output via an associated printer 182b.

Alternatively, the mobile device 110 may access remote printers indirectly via a service that is accessible in association with or supported by the communication system 140. For example, the mobile device 110 may access a print service offered by a wireless carrier associated with the communication system 140. The mobile device 110 can communicate one or more selected images to the service provider, and the service provider can generate the hard copy outputs for delivery or pickup. As an example, the mobile device 110 can communicate one or more images, via the communication system 140, to a service provider, and the service provider may receive or otherwise retrieve the images using an associated computer 180b. The service provider controls the computer 180b and associated printer 182b to produce the requested hard copy output.

The mobile device 110 may also include the capability to communicate with a network 170 via a wireless access point 150. The wireless access point 150 may support a communication standard that is distinct from the wireless standard supported by the communication system 140. As an example, the mobile device 110 can include a wireless transceiver configured to support communications with an IEEE 802.11 access point 150. The mobile device 110 can communicate via the access point 150 to generate hard copy output from a remote printer in much the same manner as is available using the wireless communication system 140.

The mobile device 110 may also include position location capabilities. The position location capabilities may be local to the mobile device 110 or may operate in conjunction with supporting systems, such as the wireless communication system 140. As an example, the mobile device 110 can implement a standalone GPS receiver that is able to receive ranging signals from a source within a position location system, such as a GPS satellite vehicle 160. The mobile device 110 can independently determine its position using the ranging signals.

In another embodiment, the mobile device 110 can determine its position in association with the communication system 140. For example, the mobile device 110 may support position location as provided by a cellular communication system. In such an embodiment, the mobile device 110 may receive ranging signals from multiple sources, such as GPS satellite vehicles 160 as well as ground stations from the communication system. The mobile device 110 can communicate information or data associated with the ranging signals to the communication system 140. The communication system 140 can implement a Position Determination Entity (PDE) to determine the position of the mobile device 110 based on the information or data received from the mobile device 110.

The mobile device 110 can utilize its position to dynamically obtain or update a list of nearby service providers. As an example, a wireless communication system 140 that is capable of determining the position of the mobile station 110 can offer location based services to the mobile station 110 when the mobile station 110 initiates remote printing. The mobile station 110 can request a list or catalog of service providers from the wireless communication system 140, and the list can be dynamically generated by the wireless communication system 140 based on the position of the mobile device 110.

The user of the mobile device 110 can then examine the list of service providers to determine the type of service offered. For example, some service providers may offer printers, and the user may travel to the service provider to generate local output at the printer. Other service providers may, for example, permit downloading and remote printing of selected images, and the images may be delivered to a location that can be selected by the mobile device 110 user based on the mobile device 110 location.

The mobile device 110 integrates the UPA to provide multiple print options to the user of the mobile device 110. This enables the user of the mobile device 110 to have many options for hard copy output, even in situations where some options are not available.

Figure 2:
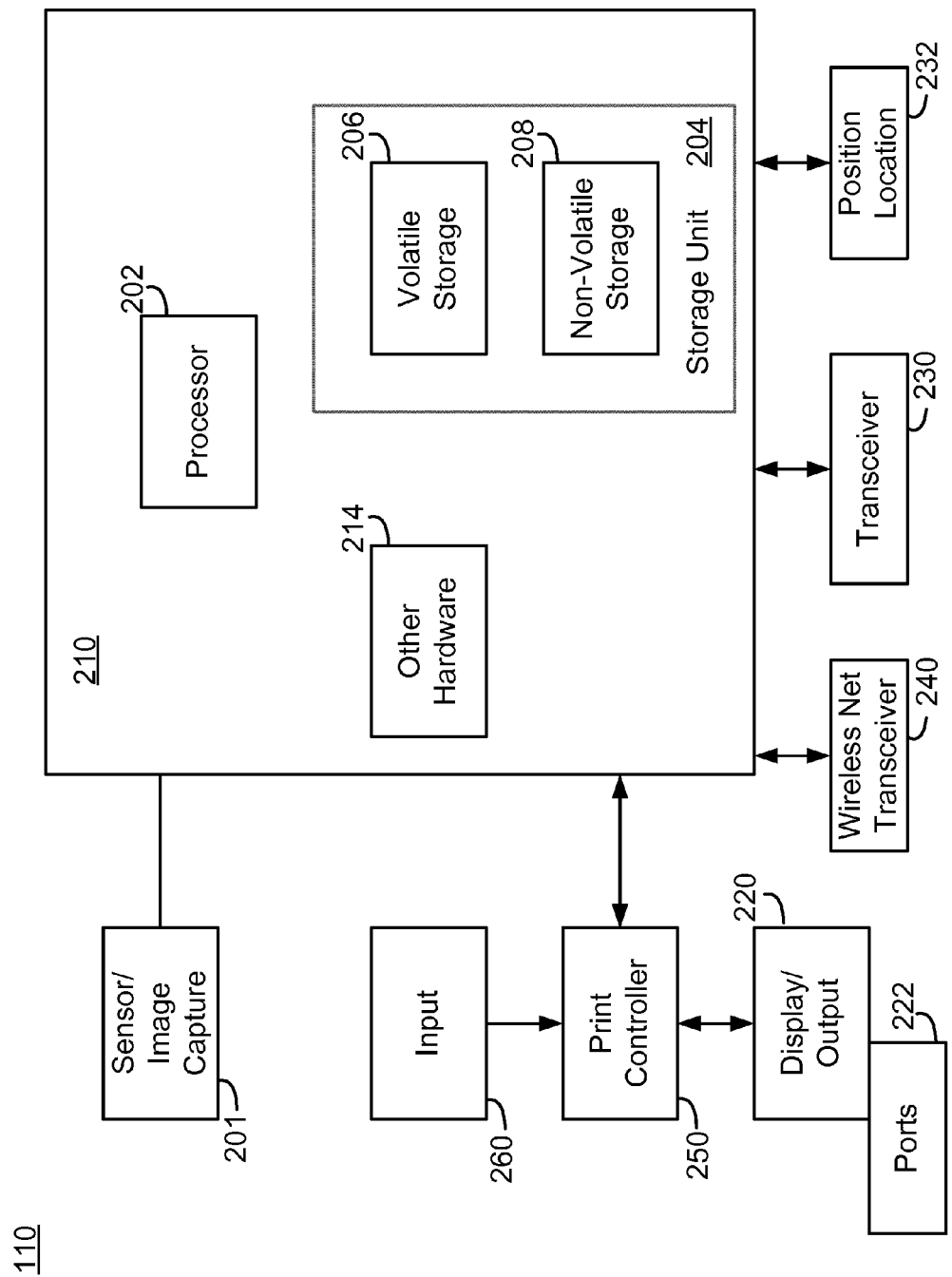
FIG. 2 is a simplified functional block diagram of an embodiment of a mobile device.

FIG. 2 is a simplified functional block diagram of an embodiment of a mobile device 110, such as the mobile device 110 of FIG. 1. The mobile device 110 may be a digital camera, a camcorder, a wireless/mobile/cellular/PCS phone, a personal digital assistant (PDA), a lap top computer or some other device.

The mobile device 110 may include a sensor 201, an image processing unit 210, a transceiver 230, wireless network transceiver 240, position location module 232, print controller 250, inputs 260, and a display and/or output 220. The output 220 may include or be coupled to one or more ports 222.

The sensor 201 may be a camera or video camera sensor adapted to capture images or video sequences. The sensor 201 may include color filter arrays (CFAs) arranged on a surface of individual sensors. For example, the sensor 201 can be a charge coupled device, CMOS camera, and the like, or some other module for capturing images.

The image processing unit 210 may include a processor 202, other hardware 214, and a storage unit 204. The storage unit 204 may store images or video sequences before and after processing. The storage unit 204 may include volatile storage 206 and non-volatile storage 208. The storage unit 204 may comprise any type of data storage means, such as dynamic random access memory (DRAM), FLASH memory, NOR or NAND gate memory, or any other data storage technology.

The image processing unit 210 may process images and/or video sequences. The image processing unit 210 may comprise a chip set for a mobile radiotelephone, which may include hardware, software, firmware, and/or one or more microprocessors, digital signal processors (DSPs), application specific integrated circuits (ASICs), field programmable gate arrays (FPGAs), or various combinations thereof.

The image processing unit 210 may include a local memory coupled to a front-end image/video processing unit and an image/video coding unit. The coding unit may comprise an encoder/decoder (CODEC) for encoding (or compressing) and decoding (or decompressing) digital video data. The local memory may comprise a smaller and faster memory space relative to the storage unit 204 or may include memory from the storage unit 204. For example, the local memory may comprise synchronous dynamic random access memory (SDRAM) that is distinct from the storage unit 204. The local memory may comprise "on-chip" memory integrated with the other components of the processing unit 210 to provide fast access to data during a processor-intensive coding process.

The image processing unit 210 may perform one or more image processing techniques on frames of a video sequence to improve image quality, and thereby improve the quality of a video sequence. For example, the image processing unit 210 may perform techniques such as de-mosaicing, lens rolloff correction, scaling, color correction, color conversion, and spatial filtering. The image processing unit 210 may also perform other techniques.

The transceiver 230 may receive and/or transmit coded images or video sequences to another device. The transceiver 230 may use a wireless communication standard such as code division multiple access (CDMA). Examples of CDMA standards include CDMA 1xEV-DO, WCDMA, etc.

The wireless network transceiver 240 can be configured to communicate with a packet network, such as a Local Area Network. The wireless network transceiver 240 can be configured, for example, to support a communication standard distinct from the communication standard supported by the transceiver 230. For example, the wireless network transceiver 240 can be configured to support an IEEE 802.11 communication standard. In another embodiment, the wireless network transceiver 240 can be configured to connect the mobile device 110 to a Personal Area Network (PAN). As an example, the wireless network transceiver 240 can be configured to support the Bluetooth communication standard. Although the embodiment of FIG. 2 illustrates a single wireless network transceiver 240, the mobile device 110 can implement multiple wireless network transceivers 240 or a reconfigurable wireless network transceiver 240 where multiple communication standards are supported.

The wireless network transceiver 240 can be configured to couple the mobile device 110 to an available wireless LAN or PAN. Additionally, or alternatively, the wireless network transceiver 240 can be configured to couple the mobile device 110 to a wireless enabled device, such as a wireless enabled printer.

The position location module 232 operates independently of or in conjunction with the transceiver 230 to generate position data or position assistance data. For example, the position location module 232 may be a GPS receiver that is able to determine the location of the mobile device 110. Alternatively, the position location module 232 may be an assisted GPS receiver that operates in conjunction with the transceiver 230 to provide pseudo-range information to a network position determination entity. The network position determination entity can communicate the position to the mobile device 110 or use the position information for a location based service.

The print controller 250 can manage the various print options, inputs, and outputs that are part of the printing process. The print controller 250 can receive one or more inputs from the devices that make up the inputs 260 to initiate the print process. Additionally, the print controller can receive, via the inputs, user selections and controls.

The print controller 250 can also provide one or more outputs via the display and/or output 220. For example, the print controller may retrieve images from the image processing unit 210 for display, in order to prompt the user for an image selection. The print controller 250 can also control the one or more signals and images directed to the one or more output ports 222 when wired connections are used.

The print controller 250 may also manage the generation and processing of signals according to the selected communication protocol. For example, the print controller 250 may manage the host controls or the peripheral operation when connected as a USB device. Similarly, the print controller 250 may control the formatting of image files for transmission to selected output devices.

In addition to or instead of the elements shown in FIG. 2, other elements may be included in mobile device 110. The architecture illustrated in FIG. 2 is merely an example. The techniques described herein may be implemented with a variety of other architectures.

The mobile device 110 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions, when executed by one or more processors, cause one or more processors to perform certain aspects of the functionality described in this disclosure.

Figure 3:
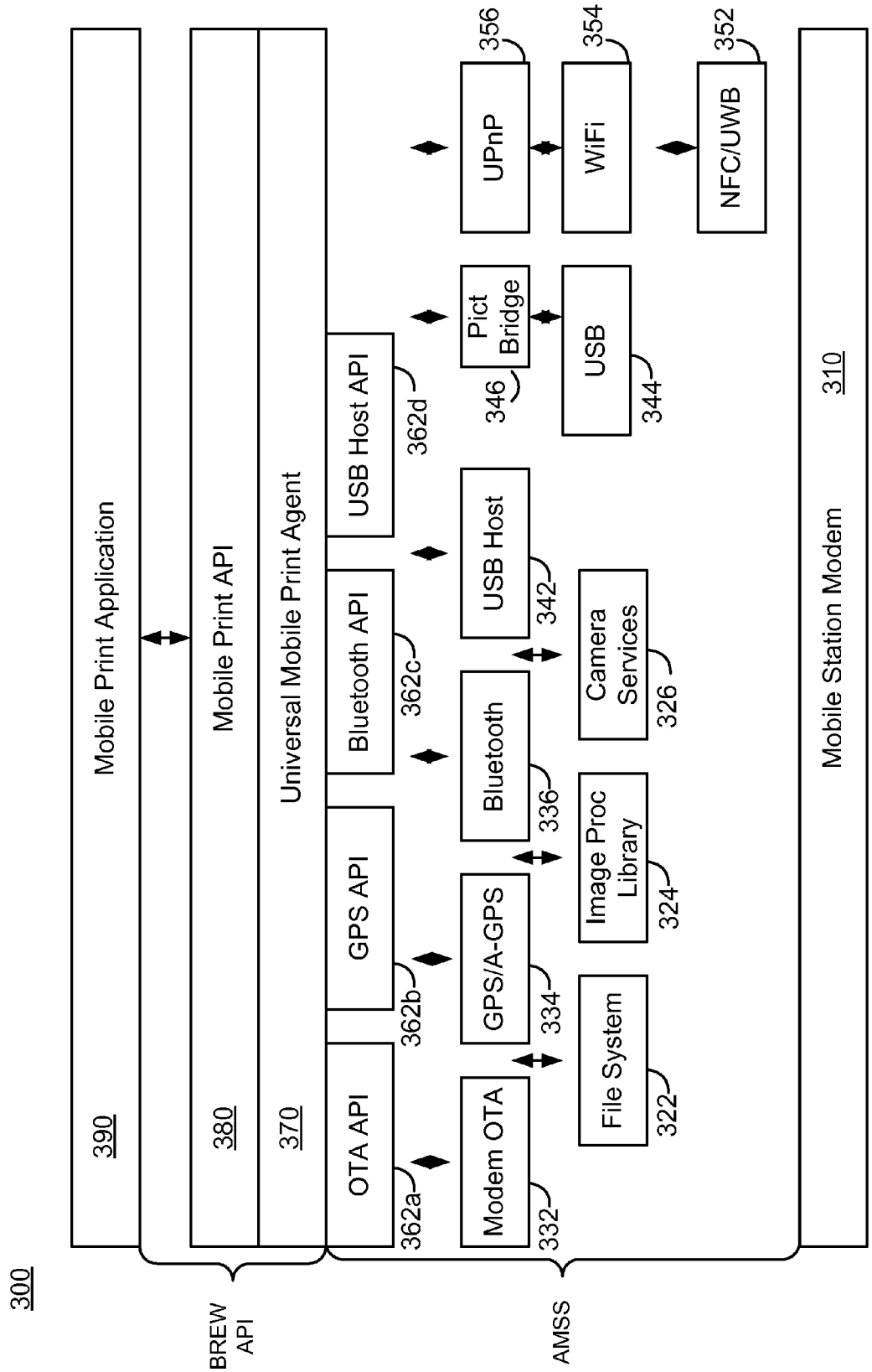
FIG. 3 is a simplified functional block diagram of an embodiment of a mobile printing architecture.

FIG. 3 is a simplified functional block diagram of an embodiment of a mobile printing architecture 300. The mobile print architecture 300 of FIG. 3 can be implemented, for example, in the mobile device of FIG. 2.

The mobile printing architecture 300 leverages the existing hardware and software existing in many mobile devices. The existing hardware and software is augmented with a unified and coordinated Universal Print Agent (UPA) 370 that manages the information and data required in the various output scenarios.

The mobile print architecture 300 can be built on top of existing mobile device hardware by interfacing with available program interfaces. As one example, the UPA can be configured to interface with existing cellular telephone hardware via an existing interface, such as the Binary Runtime Environment for Wireless (BREW).

The embodiment of FIG. 3 illustrates a mobile printing architecture 300 built on the foundation of the mobile station modem 310 hardware that may be part of a baseband processing portion of a cellular telephone. However, the architecture is merely illustrative of one possible implementation.

The mobile printing architecture 300 is built on the hardware foundation of a mobile station modem 310 such as would be included in a typical cellular telephone. The mobile station modem 310 can be configured to provide the processing of the baseband data and information, including information captured or otherwise received locally as well as information received by the mobile device and converted to baseband.

One or more mobile station processing modules can be built in conjunction or over the mobile station modem 310. Each of the mobile station processing modules illustrated in FIG. 3 are shown as software modules operating over the mobile station modem 310. However, the mobile station processing modules may be implemented as hardware, software, or a combination of hardware and software. Additionally, the type and number of processing modules illustrated in FIG. 3 is illustrative of a typical implementation and is not a limitation on the mobile print architecture 300.

The mobile station processing modules can include a file system module 322 that is configured to manage and organize the various files, including image files, that can be stored in the mobile device. The UPA 370 can, for example, access the files via the file system module 322 in order to permit a user to navigate and select one or more desired images for communication to an output device.

An image processing library 324 can include one or more memory locations configured to store the captured images within the mobile device. The file system module 322 tracks the various images stored in the image processing library 324.

A camera services module 326 operates to interface, via the mobile station modem 310 to one or more sensors, cameras, or image capture devices. The camera services module 326 can be configured to provide the encoding or decoding of captured images to convert the images to desired image file configurations. For example, the camera services module 326 can be configured to encode an image captured by a camera to a particular encoded file format, such as a JPEG encoded file format.

A modem over-the-air (OTA) processing module 332 can be configured to process incoming and outgoing data from and to the format required by the mobile station modem 310. The modem OTA processing module 332 is utilized when information is exchanged via the mobile station modem 310. The UPA 370 can initialize and utilize the modem OTA processing module 332 when the mobile device transceiver is used to communicate information to an output device via the communication system, such as a cellular telephone system.

The GPS/A-GPS information module 334 is representative of a position location module that can be used to initiate or otherwise determine a location of the mobile device when location based services are used. The UPA 370 can initiate position location at the request of location based services running on top of or in conjunction with the UPA 370.

A Bluetooth module 336 can be included when the mobile device supports communication using a Bluetooth communication standard. The UPA 370 can configure the Bluetooth module 336 to push an image to an output device, via the appropriate transceiver hardware, when a wireless connection to local output device is used as the connection type.

A USB device host module 342 can be utilized when the mobile device operates as a host USB device. The USB device host module 342 can interface with the Universal Plug-and-Play (UPnP) module 356 when the mobile device interfaces and operates as a host to UPnP devices as output devices.

Similarly, a USB peripheral module 344 can operate with a PictBridge module 346 to support operating the mobile device as a USB peripheral, and in particular operating the mobile device as a PictBridge enabled USB peripheral. In the PictBridge configuration, the output device, such as a PictBridge enabled printer, can operate as a host to control one or more interfaces on the mobile device or a printer control that permits access, selection and output of a desired image stored within the mobile device.

The UPnP module 356 has been described as interfacing with the USB host module 342 but is not limited to providing UPnP interface to wired connections. The UPnP module 256 may also interface with one or more wireless modules in order to provide the UPnP functionality over a wireless link.

For example, the UPnP module 356 may interface with a WiFi module 354, such as an IEEE 802.11 compliant interface module to permit UPnP configuration and subsequent output to occur over a wireless interface. The UPnP module 356 can control the UPnP interfacing and configuration and can operate to convert a selected image to the proper format as defined by the active UPnP configuration.

The WiFi module 354 is used to provide the interface to WiFi transceiver hardware. Other modules can be used to provide the interfaces to other wireless hardware. For example, a Near Field Communication/Ultra Wide Band module 352 can be used where near filed or ultra wide band communications is used as a wireless link to a local device or network gateway.

The Universal Print Agent (UPA) 370 runs on top of the various processing modules to manage and conduct the print operation. The UPA 370 interfaces with the various processing modules via its corresponding Application Program Interface (API). For example, an OTA API 362a operates to provide a standard interface between the UPA 370 and the modem OTA module 332. Similarly, a GPS API module 362b, Bluetooth API module 362c, USB host API module 362d and other API modules provide the interface between the UPA 370 and a corresponding processing module that can be accessed by the UPA 370.

A mobile print API module 380 runs on top of the UPA 370 to provide a single API to an application that may run on top of the UPA 370. In some instances, the mobile print API module 380 may be considered as part of the UPA 370.

A print application 390, such as a third party print application, may run on top of the UPA 370 and interface via the mobile print API module 380. The mobile print API module 380 permits print applications 390 to be written by third party software developers. Such applications may be pre-installed on the mobile device or may be downloaded and installed on the mobile device by the end user. For example, a particular print application 390 for a mobile device may be written by a third party printer manufacturer that also supplies networked printing services. Such an application may greatly facilitate selection and use of output devices and services provided by the third party author.

The print application 390 operates to simplify the navigation, selection, and communication with output devices. The print application 390 operates to provide the user with a seamless, easy to use, and trusted printing experience when supplied by a major print manufacturer or service provider.

Figure 4:
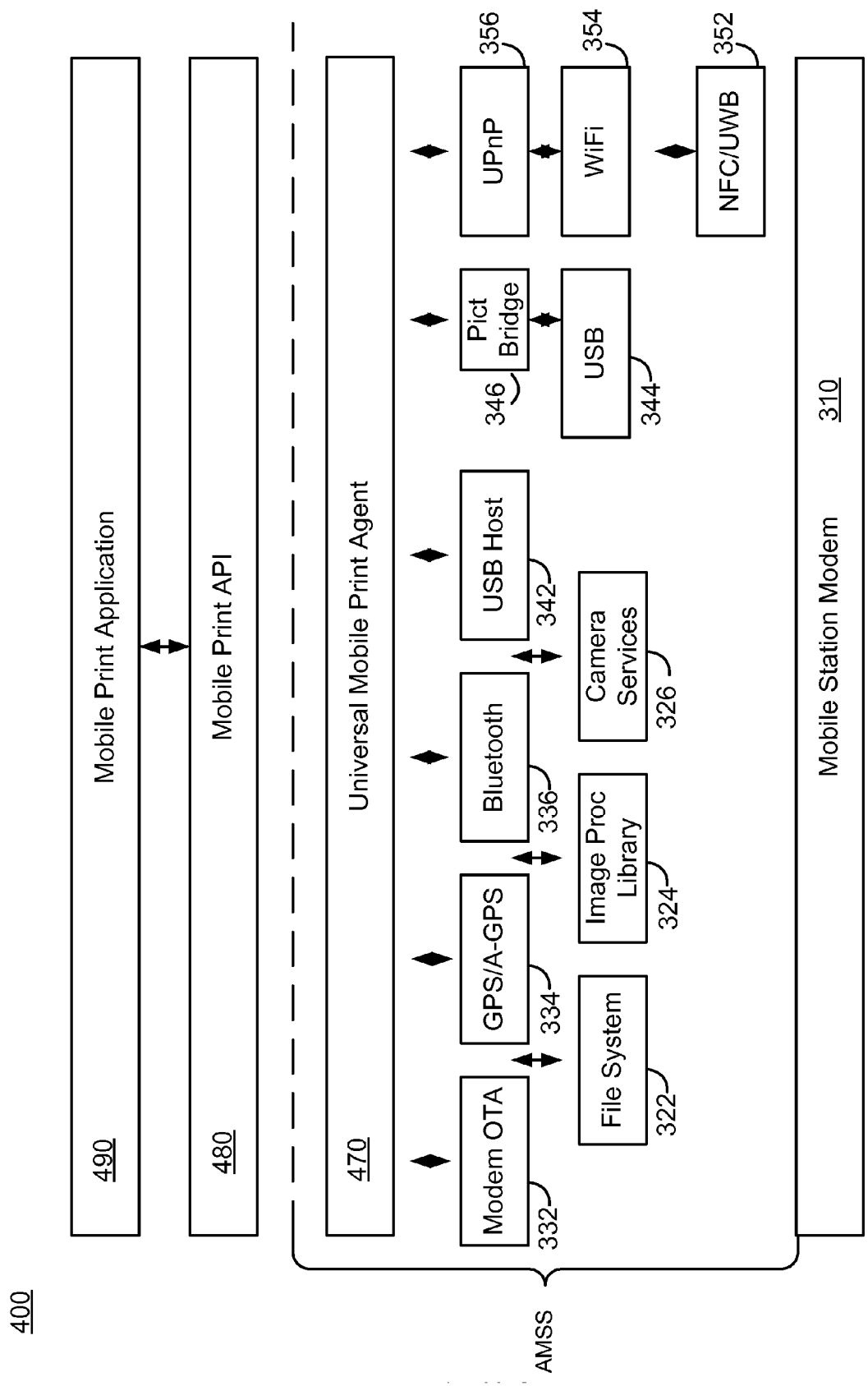
FIG. 4 is a simplified functional block diagram of an embodiment of a mobile printing architecture.

FIG. 4 is a simplified functional block diagram of an embodiment of a mobile printing architecture 400. The mobile printing architecture 400 of FIG. 4 is similar to that shown in FIG. 3. However, in the mobile printing architecture 400 of FIG. 4, the UPA 470 is integrated in the software of the mobile device, and needn't interface through application interfaces to each of the processing modules within the mobile device. Some of the processing modules are omitted from the architecture of FIG. 4. However, the type and number of processing modules that can be implemented within a mobile device are subject to design tradeoffs.

The architecture 400 includes a mobile station modem 310 interfacing with various processing modules. The processing modules include a modem OTA module 332, a GPS information module 334 that otherwise operates a position location module, a Bluetooth module 336, a USB host module 342, a USB peripheral module 344 interfacing with a PictBridge module 346, and a WiFi module 354 interfacing to a UPnP module 356.

Unlike the architecture illustrated in FIG. 3, the mobile print architecture 400 of FIG. 4 implements the UPA 470 within the structure of the mobile device and not via an application programming interface. Thus, the UPA 470 is configured to interface directly to each of the processing modules, e.g. 342, and need not interface through an API.

The elimination of the API layer from the mobile print architecture 400 of Figure slightly simplifies the UPA 470 and simplifies the interface between the UPA 470 and the processing modules. This can enable the UPA 470 to more efficiently access and operate each of the processing modules. A mobile print API 480 operates to provide an application program interface between the UPA 470 and a print application 490. The mobile print API 480 can be configured to provide the same API to the print application as provided in the architecture of FIG. 3, such that a print application does not need to know which architecture is implemented by the mobile device. Alternatively, the mobile print API 480 can be configured to provide a different API than that provided in the architecture of FIG. 3.

The print application 490 may be the same as the print application of the architecture of FIG. 3 or may be a print application optimized for the mobile print architecture 400 of FIG. 4. The print application 490 operates to provide the user interface to the print options.

Figure 5:
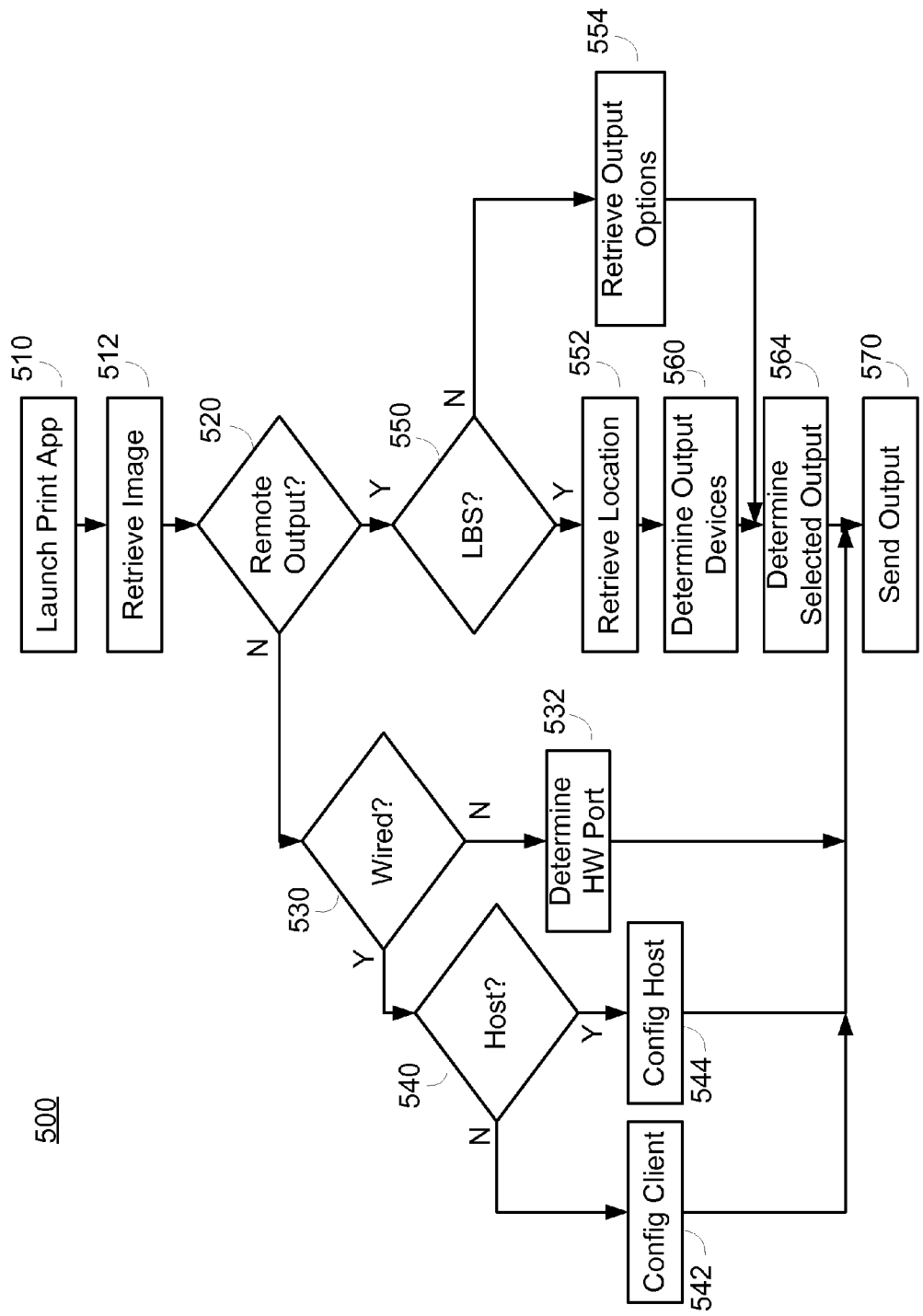
FIG. 5 is a simplified flowchart of an embodiment of a method of printing from a mobile device.

FIG. 5 is a simplified flowchart of an embodiment of a method 500 of printing from a mobile device. The method 500 can be implemented, for example, in the mobile device of FIG. 2, configured with the mobile print architecture of either FIG. 3 or FIG. 4. For example, the process can be performed by the UPA in configuration with the print application and mobile device processing modules.

The method 500 begins at block 510 when a user launches the print application running on the mobile device. The mobile device proceeds to block 512 and retrieves images from memory for display to the user. For example, the print application can be configured to control the UPA to access a file system module that enables access of an image processing library. The print application can permit the user to select one or more images for output. Alternatively, the process of displaying and selecting an image may be omitted or performed later in the method 500. The method 500 may instead proceed to determine an output device once the print application is launched. The process of selecting an image to output may be performed after connecting to the desired output device.

As described earlier, the mobile device supports multiple output connection categories. The mobile device proceeds to decision block 520 and determines if a remote output is desired. If not, the alternative option of outputting to a local output device is selected.

The mobile device proceeds to decision block 530 to determine if the desired output connection is a wired connection. The mobile device can determine this, via the print application based on the user's output device selection.

If a wired connection is not sought, the mobile device proceeds to block 532 and determines the proper wireless port used to support the wireless output device. The mobile device can, for example, initiate a wireless connection using one of multiple wireless transceivers, where each wireless transceiver supports a subset of all wireless connections.

If a wired output device is selected, the mobile device proceeds to decision block 540 to determine if the mobile device is to operate as a host or client/peripheral device over the wired connection. For example, the user can select a wired USB connection, and the mobile device can be configured as either a host or a peripheral in the USB connection.

The mobile device proceeds from decision block 540 to block 542 if the mobile device is to be configured as a client or peripheral device. One example of a situation in which the mobile device operates as a peripheral device is where a USB connection to a PictBridge enabled printer is established as the output connection. The PictBridge printer operates as a host device controlling the mobile device as a peripheral.

If, at decision block 540 the mobile device determines that it is to be configured as a host device, the mobile device proceeds to block 544 and configures the mobile device as a host device. As an example, the mobile device can be coupled over a USB connection to a UPnP printer, and the mobile device can operate as a host device to control the print process.

After configuring the mobile device as either a client device or a host device, the mobile device proceeds from either block 542 or block 544 to block 570 to communicate the selected image to the desired wired output device.

If, at decision block 520, the mobile device determines that remote output is desired, the mobile device proceeds to decision block 550 and determines if a Location Based Service (LBS) output application is desired. The mobile device can determine that an LBS output is selected in the print application, or can determine, based on the desired output selection, that LBS output devices are desired.

If LBS output devices are not desired, the mobile device proceeds to block 554 and retrieves the predetermined remote output devices and services, for example, from a list stored in memory or from a database in a connected network device. The mobile device then proceeds to block 564 where the options are presented to the user.

If, at decision block 550, the mobile device determines that LBS output is desired, the mobile device proceeds to block 552 and retrieves or otherwise initiates position determination. For example, the mobile device can initiate GPS or A-GPS position location. The operation of the print application determines if the position fix needs to be known at the mobile device, or if a network position determination is sufficient to support the LBS.

The mobile device proceeds to block 560 and determines the LBS output devices that are available. For example, the mobile device can initiate a network based position determination and, once the mobile device position is determined by a PDE on the network, can query a database at a network for output devices or services that are within a predetermined proximity of the mobile device location.

The mobile device proceeds to block 564 and presents the output device and service options to the user, for example, via the print application. The mobile device can, for example, present only non-LBS output devices and services when LBS is not utilized. Similarly, if LBS is utilized the mobile device can present only LBS output devices and services or can present available LBS output devices and services in combination with non-LBS output devices and services.

The mobile device can accept a user output device or service selection based on the presented options, and proceeds to block 570 to communicate the selected images to the selected output device. The mobile device can, for example, automatically configure the appropriate hardware, such as cellular telephone link or WiFi link, based on the selected output device.

Figure 6:
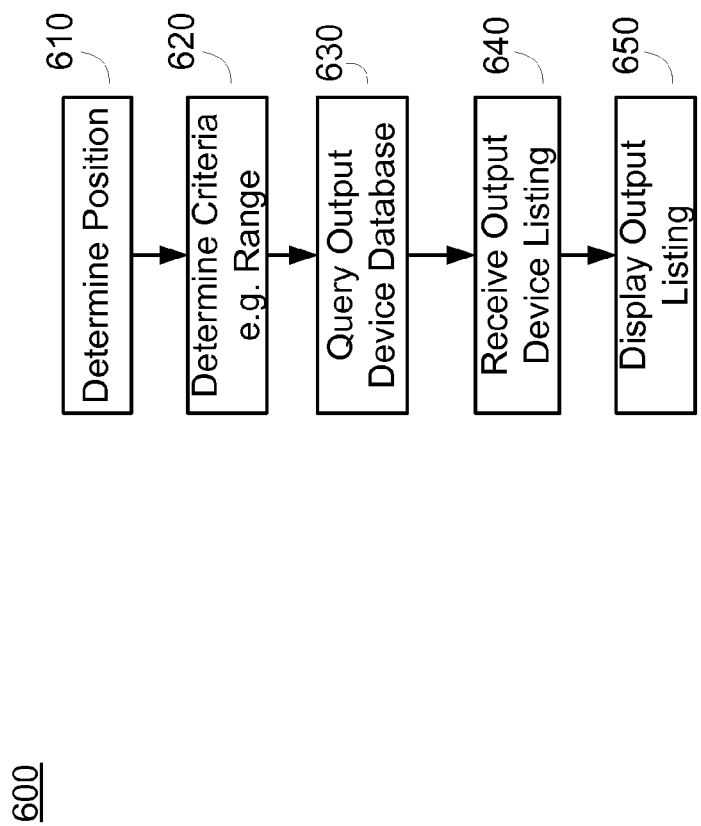
FIG. 6 is a simplified flowchart of a method of determining remote output devices using position location services.

FIG. 6 is a simplified flowchart of a method 600 of determining remote output devices using position location services. The method 600 can be performed during the method of FIG. 5, for example, in response to determining that LBS output devices are desired. The method 600 can be performed, for example, by the mobile device of FIG. 2 and can be managed by the UPA of the architectures of FIG. 3 or 4.

The method 600 begins at block 610 where the mobile device or UPA initiates position determination. The UPA can, for example, initiate position determination using a GPS/A-GPS module in the mobile device. The mobile device position can be determined at the mobile device or at a network PDE.

The mobile device proceeds to block 620 and determines the criteria or parameters for filtering potential LBS output devices. For example, the mobile device can accept user input regarding a maximum desired distance to output devices, parameters relating to identity of service providers, parameters relating to the types of output available from the output device or provider, and other parameters. As an example, the user may desire a particular brand of service provider and may desire that the output images be within a range of 1000 meters of the mobile device location.

The mobile device proceeds to block 630, where the mobile device utilizes the filter criteria to generate a query. The mobile device can query a database of output devices and service providers to determine the identity of devices and service providers, if any, that satisfy the criteria. The database can be local to the mobile device or can be in a network accessible location. For example, the device and service provider database can be stored at a network location accessible through the cellular telephone communication system, and managed by the cellular service provider. In that example, the cellular service provider may also provide the position location services, and thus, the position of the mobile device need not be transmitted to any party outside of the cellular network.

The mobile device proceeds to block 640 and receives a listing of output devices satisfying the query. The mobile device can receive the results from a local database query or from a networked or otherwise remote database.

The mobile device proceeds to block 650 and displays or otherwise presents the results of the query to the user. For example, the UPA can obtain the results of the query and can forward the results to the print application for display to the user.

Figure 7:
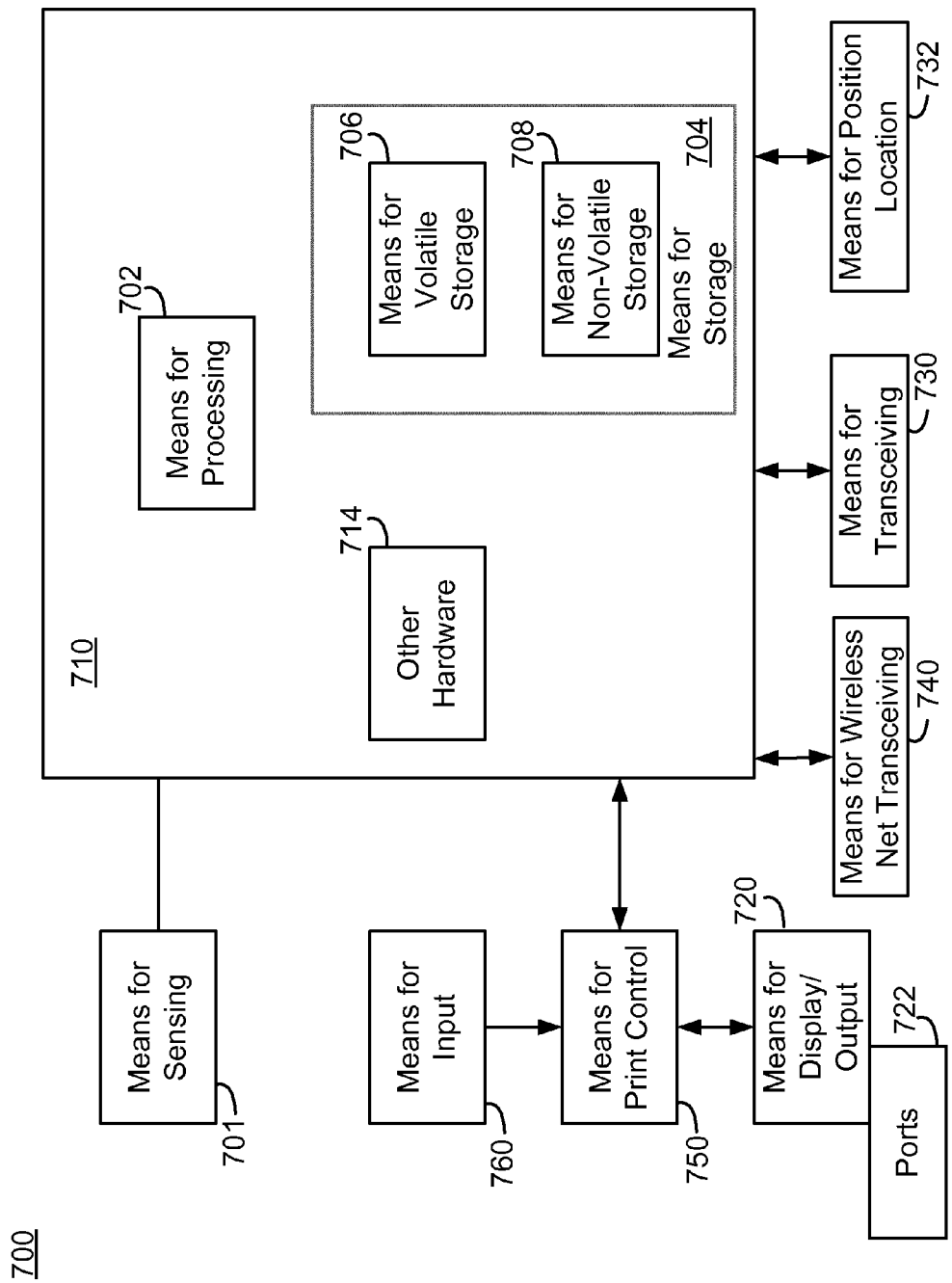
FIG. 7 is a simplified functional block diagram of an embodiment of a mobile device.

FIG. 7 is a simplified functional block diagram of an embodiment of a mobile device 700. The mobile device 700 may include a means for capturing an image 701, a means for processing the image 710, a means for transceiving 730, a means for wireless network transceiving 740, a means for position location 732, a means for print control 750, means for input 760, and a means for display and/or output 720. The means for display and/or output 720 may include or be coupled to one or more ports 722.

The mobile device includes means for capturing an image 701. The means for capturing the image is coupled to a means for processing the image 710. The means for processing the image 710 may include a means for processing 702, other hardware 714, and a means for storage 704. The means for storage 704 may store images or video sequences before and after processing. The means for storage 704 may include means for volatile storage 06 and means for non-volatile storage 708.

The mobile device a means for controlling a print operation 750. The means for controlling a print operation 750 includes means for receiving a command to initialize a print output from a mobile device. The means for controlling a print operation 750 can also include means for determining whether a selected output device is local or remote, as well as means for determining whether a connection to the output device is established as wired or wireless.

The mobile device can include several means for communicating the image to the output device. The means for communicating the image can include means for communicating the image via a wired communication port 722. The means for communicating the image can include means for communicating the image via a wireless connection, 730, 740.

The means for controlling a print operation 750 can control the means for communicating 730 at least one image stored within the mobile device to the selected output device via the connection. The means for controlling the print operation can also operate in conjunction with a means for initiating position location of the mobile device 732. The means for controlling the print operation can also include means for determining output device options based, at least in part, on the location of the mobile device.

The method, system and apparatus and/or a microchip in the apparatus may enable home, retail, and online picture printing. A mobile device can support each of the different output scenarios in order to greatly simplify the print process. Examples of connections to output devices in each of the home, retail, and online scenarios are provided to illustrate some of the possible output connections that may be managed and supported by the mobile device.

Home

At home, the mobile device can connect to a local output device to support printing of images stored in the mobile device. For example, the mobile device may connect via a universal serial bus (USB) link to a personal computer (PC) to a photo printer. There may be a USB plus PictBridge module direct from the mobile device (e.g., cellular handset) to a photo printer. Alternatively, the mobile device can operate as a host over a USB connection directly to a printer.

Alternatively, a user can use the print application on the mobile device to select a remote service or remote output device. A user may want prints mailed to the user. In one example, the user can select an OTA link via a cellular network to a carrier service. The user may select special value-added prints using the carrier provided service that would not ordinarily be available via a home printer.

There are virtually an unlimited number of possibilities. A user may print to a Bluetooth (BT) enabled home printer (BT to photo printer). A user may print to a home printer using a memory card (Digital Print Order Format (DPOF) to memory card). A user may want to print to a Universal Plug-and-Play (UPnP) enabled home printer using a wireless network communication protocol (UPnP/WiFi to photo printer). A user may want to print to a UPnP enabled home printer via an ultra-wideband wireless link (UPnP/UWB to photo printer).

Retail

At a retail location, the mobile device may use a Bluetooth wireless connection to print at a photo kiosk. The mobile device may initiate position location or a general LBS application in order to identify and locate nearby retailers. For example, the mobile device can utilize an over-the-air interface to route selected images to a retailer identified using a global positioning satellite (GPS) system or A-GPS.

In another example of an LBS application, a user can determine the position of the mobile device and identify retailers within a predetermined radius that provide printing services. The user may want prints waiting at a local retail outlet and may utilize an OTA link in combination with GPS position location to enable identification and selection of participating local retailer(s).

Similarly, an example of remote output where position location is not needed is the scenario where a user wants prints waiting at a local retail outlet. In such a scenario, the mobile device can establish an OTA link to a participating online web service. The user may identify a participating local retailer for pick up of the prints or may utilize LBS to identify participating retailers.

As examples of other scenarios, a user may print to a kiosk using memory card (DPOF to memory card). A user may print to a kiosk using Near Field Communication (NFC) (NFC to kiosk). A user may print to a WiFi enabled kiosk (WiFi to kiosk). A user may print to a UWB enabled kiosk (UWB to kiosk).

Online

The mobile device may print via a modem over the air to a carrier-based online service. The user may want prints mailed to the user. As an example, the mobile device can establish an OTA link to online web printing service. The mobile device can use, for example, the cellular communication system as a gateway to an Internet print service provider. The user may want special value-added prints using the online web printing service.

A method, system and mobile device that enable all three printing situations (home, retail, and online) may enable a convenient "universal" printing service. The method, system and mobile device may be relatively easy to use with a unified print agent, which may seamlessly integrate several connectivity options and hide underlying technology complexities. Some printing choice(s) may always be available. Higher print volumes and multiple output options may lower print costs.

The method may promote use of a carrier's own printing service, promote increased use of airtime and carrier LBS for retail print routing option, and/or promote use of carrier options even if at home. For example, a user may try to print at home but run out of ink or paper, see that the online print options are also available, and route to a local retailer.

An end-to-end system may be in two pieces: a unified and coordinated UPA that manages all information and data required for all use cases; and integrated on top of UPA, a mobile print application for a seamless, easy to use, and trusted printing experience. Tight coordination of these two pieces may create an end-to-end system that is complete, convenient and easy to use. The system may be configurable to benefit the entire mobile printing value-chain.

A Universal Print Agent may provide connectivity technology coordination & configuration, discovery, and a unified application programming interface (API) that may handle multiple mobile station modem (MSM) architectures & technology variations and handle native and Binary Runtime Environment for Wireless (BREW) API versions.

The system may tie to CDMA 1x Evolution Data Optimized (EV-DO) Revision A (DORA) and High Speed Uplink Packet Access reverse link (HSUPA R/L) for OTA services. The system may use USB HS/WiFi/UWB for new "short range" services.

The system may use GPS information to make local retail service convenient.

For example, the system may use time of day, current location and distance to photo finisher plus give map from current location to photo finisher for customer. The system may use time of day and estimate of inside or outside of buildings to improve image post-processing quality for printing.

A full solution may be bundled into an advanced mobile subscriber software release with an ability to configure which services are supported. This allows configuration based on a carrier's and/or OEM desire.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

Various embodiments have been described. These and other embodiments are within the scope of the following claims.

What is claimed is:

1. A method of operating a mobile device for providing print output, the method comprising:
   initializing a print output from the mobile device;
   determining a location of the mobile device by initiating a position location procedure;
   querying a local database that is maintained by the mobile device to determine output device options based, at least in part, on the determined location of the mobile device and one or more filtering criteria which include at least a threshold proximity of the determined location of the mobile device to one or more of the output device options;
   determining the output device options from the local database in response to the query;

determining whether a selected output device is local or remote, the selected output device being selected from among the output device options;

determining that a connection from the mobile device to the selected output device is wireless based on an identity of the selected output device, wherein the connection to the selected output device is available at the determined location of the mobile device; and communicating, via a print application interface to a wireless transceiver for transmission over the connection, at least one image stored within the mobile device to the selected output device for conversion into a hard copy.

2. The method of claim 1, further comprising determining, the wireless transceiver within the mobile device through which the at least one image is communicated to the selected output device.

3. The method of claim 2, wherein the wireless transceiver comprises a transceiver configured to communicate with a wireless telephone system.

4. The method of claim 2, wherein the wireless transceiver comprises a transceiver configured to communicate over a packet-based network.

5. The method of claim 2, wherein the wireless transceiver comprises a transceiver configured to support an IEEE 802.11 wireless communication standard.

6. The method of claim 2, wherein the wireless transceiver comprises a transceiver configured to support a Bluetooth communication standard.

7. The method of claim 1, wherein determining the output device options includes:

determining an output device list that lists a set of output devices satisfying the one or more filtering criteria, wherein the output device options are determined from the output device list.

8. The method of claim 1, further comprising determining whether the mobile device operates as a host device or a client device based in part on the selected output device.

9. A method of operating a mobile device for providing print output, the method comprising:

determining a location of the mobile device by initiating a position location procedure;

querying a local database that is maintained by the mobile device to determine output device options based, at least in part, on the determined location of the mobile device and one or more filtering criteria which include at least a threshold proximity of the determined location of the mobile device to one or more of the output device options;

determining the output device options from the local database in response to the query;

receiving a selection of one of the output device options for printing an image stored within the mobile device;

enabling, by the mobile device from the determined location, a connection to the selected output device via a wireless transceiver within the mobile device, wherein the connection is determined to be wireless based on an identity of the selected output device; and communicating, via a print application interface to the wireless transceiver for transmission over the wireless connection, the image to the selected output device for conversion into a hard copy.

10. An apparatus configured to provide mobile print output, the apparatus comprising:

an image capture device;

a wireless transceiver;

a communication processing module coupled to a wired communication port;

a position location module configured to support location determination of the apparatus; and a Universal Print Agent (UPA) configured to utilize a determined location of the apparatus by initiating a position location procedure via the position location module, to query a local database that is maintained by the apparatus to determine a list of output devices from which an output device can be selected based, at least in part, on the determined location of the mobile device and one or more filtering criteria which include at least a threshold proximity of the determined location of the mobile device to one or more of the output device options, to determine the list of output devices from the local database in response to the query, and to selectively communicate, to the wireless transceiver for transmission over a connection between the apparatus and the selected output device that is available at the determined location, an image captured by the image capture device to a selected output device for conversion into a hard copy, wherein the connection is determined to be wireless based on an identity of the selected output device.

11. The apparatus of claim 10, wherein the position location module comprises a GPS receiver.

12. The apparatus of claim 10, wherein the position location module supports A-GPS position determination.

13. The apparatus of claim 10, wherein the wireless transceiver comprises a wireless telephone transceiver.

14. The apparatus of claim 10, wherein the wireless transceiver comprises a Bluetooth enabled transceiver.

15. The apparatus of claim 10, wherein the wireless transceiver comprises an IEEE 802.11 enabled transceiver.

16. The apparatus of claim 10, wherein the communication processing module comprises a Universal Serial Bus host communication module.

17. The apparatus of claim 10, wherein the communication processing module comprises a Universal Serial Bus peripheral communication module.

18. The apparatus of claim 10, wherein the UPA is associated with print application interfaces to each of the wireless transceiver and the communication processing module via a corresponding Application Program Interface module.

19. An apparatus comprising a machine-readable memory storing a set of processor executable instructions, which, when executed by a mobile device, cause the mobile device to perform a method comprising:

receiving a command to initialize a print output from the mobile device;

determining a location of the mobile device by initiating a position location procedure;

querying a local database that is maintained by the mobile device to determine output device options based, at least in part, on the determined location of the mobile device and one or more filtering criteria which include at least a threshold proximity of the determined location of the mobile device to one or more of the output device options;

determining the output device options from the local database in response to the query;

determining whether a selected output device is local or remote, the selected output device being selected from among the output device options;

determining that a connection from the mobile device to the selected output device is wireless based on an identity of the selected output device, wherein the connection from the mobile device to the selected output device is available at the determined location of the mobile device; and communicating, via a print application interface to a wireless transceiver for transmission over the connection, at least one image stored within the mobile device to the selected output device for conversion into a hard copy.

20. The apparatus of claim 19, wherein the method further comprises establishing the connection by controlling a communication processing module corresponding to the connection.

21. The apparatus of claim 19, wherein the method further comprises determining the wireless transceiver within the mobile device through which the at least one image is communicated to the selected output device.

22. The apparatus of claim 19, wherein the method further comprises determining a configuration as a host device or a client device based in part on the identity of the selected output device.

23. An apparatus configured to provide mobile print output, the apparatus comprising:
  means for receiving a command to initialize a print output from a mobile device;
  means for determining a location of the mobile device by initiating a position location procedure;
  means for querying a local database that is maintained by the mobile device to determine output device options based, at least in part, on the determined location of the mobile device and one or more filtering criteria which include at least a threshold proximity of the determined location of the mobile device to one or more of the output device options;
  means for determining the output device options from the local database in response to the query;
  means for determining whether a selected output device is local or remote, the selected output device being selected from among the output device options;
  means for determining that a connection from the mobile device to the selected output device is wireless based on an identity of the selected output device, wherein the connection from the mobile device to the selected output device is available at the determined location of the mobile device; and
  means for communicating, via a print application interface to a wireless transceiver for transmission over the connection, at least one image stored within the mobile device to the selected output device for conversion into a hard copy.

24. The apparatus of claim 23, further comprising means for processing the at least one image to a communication protocol.

25. The apparatus of claim 23, wherein the means for determining the location of the mobile device includes:
  means for initiating the position location procedure.

26. An apparatus configured to provide mobile print output, the apparatus comprising:
  logic configured to initialize a print output from the mobile device;
  logic configured to determine a location of the mobile device by initiating a position location procedure;
  logic configured to query a local database that is maintained by the mobile device to determine output device options based, at least in part, on the determined location of the mobile device and one or more filtering criteria which include at least a threshold proximity of the determined location of the mobile device to one or more of the output device options;
  logic configured to determine the output device options from the local database in response to the query;
  logic configured to determine whether a selected output device is local or remote, the selected output device being selected from among the output device options;
  logic configured to determine that a connection from the mobile device to the selected output device is wireless based on an identity of the selected output device, wherein the connection from the mobile device to the selected output device is available at the determined location of the mobile device; and
  logic configured to communicate, via a print application interface to a wireless transceiver for transmission over the connection, at least one image stored within the mobile device to the selected output device for conversion into a hard copy.

27. A non-transitory computer-readable medium containing instructions stored thereon, which, when executed by an apparatus configured to provide mobile print output, cause the apparatus to perform operations, the instructions comprising:
  program code to initialize a print output from the mobile device;
  program code to determine a location of the mobile device by initiating a position location procedure;
  program code to query a local database that is maintained by the mobile device to determine output device options based, at least in part, on the determined location of the mobile device and one or more filtering criteria which include at least a threshold proximity of the determined location of the mobile device to one or more of the output device options;
  program code to determine the output device options from the local database in response to the query;
  program code to determine whether a selected output device is local or remote, the selected output device being selected from among the output device options;
  program code to determine that a connection from the mobile device to the selected output device is wireless based on an identity of the selected output device, wherein the connection from the mobile device to the selected output device is available at the determined location of the mobile device; and
  program code to communicate, via a print application interface to a wireless transceiver for transmission over the connection, at least one image stored within the mobile device to the selected output device for conversion into a hard copy.

28. The method of claim 1, wherein the at least one image is communicated from the mobile device to the selected output device via the connection while the mobile device remains located at the determined location.

29. The method of claim 1, wherein the mobile device is a cellular telephone.

30. The method of claim 1, wherein the querying queries the local database without relying upon a network connection.

* * * * *